Patented May 7, 1940

2,199,934

UNITED STATES PATENT OFFICE 2,199,934

PROCESS OF PREPARING HIGHER HALOGENATED KETONES

Paul Heisel and Albert Hendschel, Gersthofen, near Augsburg, Germany, assignors to I. G. Farbenindustrie Aktiengesellschaft, Frankfort-on-the-Main, Germany No Drawing. Application January 25, 1937, Serial No. 122,311. In Germany January 28, 1936

9 Claims. (Cl. 260—593)

The present invention relates to a process of preparing higher halogenated ketones.

The higher halogenated ketones have generally been made by introducing into the aqueous solution of the ketone, in the presence of an agent capable of binding the hydrogen halide, for instance marble, a quantity of halogen corresponding with the stage of halogenation desired. This method of operating is very complicated because the halogenation product desired has to be separated without loss from the solution of calcium salt produced in order to distil it fractionally after it has been dried.

In this mode of halogenation the yields of individual higher halogenated ketones are unsatisfactory, because the quantity of superhalogenated products formed is large on an industrial scale and there is still unaltered starting material.

Processes are already known in which ketones are halogenated at a raised temperature without the addition of water or an agent capable of binding the hydrogen halide, but in the presence of a catalyst. These processes likewise do not solve the problem of the industrial production of individual higher halogenated ketones in a satisfactory yield.

Now we have found that higher halogenated ketones may readily be made by halogenating not the ketones themselves, but their readily accessible mono-halogen derivatives. The monohalogenated ketones may be prepared, for instance, by causing halogen to act upon the ketone in the vapor phase in a manner similar to that described for the case of hydrocarbon in U. S. patent application Serial No. 108,909 filed on November 2, 1936, in the name of Paul Heisel, wherein the halogen is blown through a capillary in counter-current to the vapor of the hydrocarbon at a temperature lower than the boiling point of the halogenation product. Thus the ketones may be made by blowing the halogen through a capillary in counter-current to the vapor of the ketone at a temperature lower than the boiling point of the monohalogenated product. The invention is not limited to the use of monohalogenated ketones made in this manner; any known method may be used for making the monohalogenated ketones which are to be halogenated according to the present invention.

We have found that unlike the ketones themselves the monohalogenated ketones are indifferent to hydrogen halide under the halogenation conditions. It is unnecessary, therefore, to provide for binding the hydrogen halide by addition of water and agents capable of such binding so that the difficulty which such addition causes in the further treatment of the product and in the yield is eliminated. It suffices to introduce the required quantity of halogen in the usual manner at a temperature below the boiling point of the monohalogenated ketone to be further halogentated, generally in the cold, until the monohalogen ketone has been transformed into the required higher halogenation stage. If desired a catalyst may be present and the mass may be stirred and may be under pressure. After the introduction of halogen has been interrupted the product is purified by distillation, for instance under reduced pressure. Higher halogenated ketones may thus be made readily and in any desired quantity from the monohalogen ketones. The yields of pure products amount to 90 per cent.

The following examples serve to illustrate the invention but they are not intended to limit it thereto:

(1) 120 kilos of bromine are introduced into 100 kilos of monobromacetone, while cooling and stirring. The content of the reaction vessel is in this case suitably exposed to the action of light. As soon as the addition of bromine is complete, the reaction product is distilled under reduced pressure. 4.5 kilos of symmetrical dibromacetone and 150 kilos of assymetrical dibromacetone are obtained. Furthermore 4.75 kilos of more highly brominated products are formed.

(2) 100 kilos of monochloracetone are treated with 177 kilos of chlorine at 30° C. to 40° C., while stirring. The reaction product is then fractionally distilled under reduced pressure. 150 kilos of 1.3.3-trichloracetone are obtained besides 7 kilos of 1.1.1-trichloracetone. Furthermore, 21 kilos of more highly chlorinated products are obtained.

(3) 297.85 kilos of chlorine are introduced at a temperature between 50° C. and 70° C. into 100 kilos of monochloracetone. There are obtained 220.4 kilos of pentachloracetone besides 26.45 kilos of a mixture of tetrachloracetone.

(4) 421.7 kilos of chlorine are forced into 100 kilos of monochloracetone at a temperature between 50° C. and 100° C. 286.2 kilos of hexachloracetone are obtained.

We claim:

1. The process of preparing higher halogenated ketones which comprises treating undissolved monohalogen ketones at a temperature below their boiling point with the required quantity of halogen.

2. The process of preparing higher halogenated ketones which comprises treating undissolved monohalogen ketones at a temperature below their boiling point with the required quantity of halogen, while stirring.

3. The process of preparing higher halogenated ketones which comprises treating undissolved monohalogen ketones at a temperature below their boiling point with the required quantity of halogen and purifying by distillation the crude product obtained.

4. The process of preparing higher halogenated ketones which comprises treating undissolved monohalogen ketones at a temperature below their boiling point with the required quantity of halogen and purifying by distillation under reduced pressure the crude product obtained.

5. The process of preparing higher halogenated ketones which comprises first producing a monohalogenated ketone by blowing the halogen through a capillary countercurrent to the vapors of the ketone at a temperature lower than the boiling point of the monohalogen product, then purifying the monohalogenated product and treating this purified product at a temperature below its boiling point with the required quantity of halogen in the absence of a solvent for the monohalogenated product.

6. The process of preparing higher halogenated ketones which comprises first producing a monohalogenated ketone by blowing the halogen through a capillary countercurrent to the vapors of the ketone at a temperature lower than the boiling point of the monohalogen product, then purifying by distillation under reduced pressure the monohalogenated product and treating this purified product at a temperature below its boiling point with the required quantity of halogen in the absence of a solvent for the monohalogenated product.

7. The process of preparing 1,3,3-trichloracetone which comprises introducing 177 parts of chlorine into 100 parts of monochloracetone, while stirring and subjecting the reaction product to the fractional distillation under reduced pressure.

8. The process of preparing pentachloracetone which comprises introducing 297.85 kilos of chlorine into 100 kilos of mono-chloracetone at a temperature of 50° C. to 70° C. and subjecting the reaction product to the fractional distillation under reduced pressure.

9. The process of preparing hexachloracetone which comprises introducing 421.7 kilos of chlorine into 100 kilos of monochloracetone between 50° C. and 100° C. under pressure and subjecting the reaction product to the fractional distillation under reduced pressure.

PAUL HEISEL.
ALBERT HENDSCHEL.